United States Patent Office 3,655,875
Patented Apr. 11, 1972

3,655,875
CLAM EXTRACT EFFECTIVE AGAINST SARCOMA 180 AND KREBS-2 CARCINOMA IN MICE
Arline Catherine Schmeer, % Mercy Hospital, E. 17th and Milwaukee St., Denver, Colo. 80206
Continuation-in-part of application Ser. No. 613,755, Feb. 3, 1967, which is a continuation-in-part of application Ser. No. 377,523, June 24, 1964. This application June 11, 1969, Ser. No. 832,155
Int. Cl. A61k 17/00
U.S. Cl. 424—106      2 Claims

ABSTRACT OF THE DISCLOSURE

Biologically active extracts for inhibiting the growth of sarcoma 180 and Krebs-2 carcinoma tumors in mice, and the growth of human HeLa cells in vitro, comprising extracts from the bodies or individual organs or tissues of marine invertebrates such as clams of the genus Mercenaria. The process of forming the extracts comprises the steps of macerating the bodies or individual organs or tissues to form a liquid mixture, causing impurities to precipitate from the liquid mixture, removing the precipitate and subjecting the supernatant liquid to dialysis. The extracts may be further purified by molecular sieve techniques and desalting procedures.

CROSS REFERENCE TO RELATED APPLICATIONS

This application is a continuation-in-part of the copending application of the same inventor, Ser. No. 613,755, filed Feb. 3, 1967, and entitled Substances for Inhibiting Uncontrolled Cellular Growth, now abandoned, which in turn is a continuation-in-part of the copending application of the same inventor, Ser. No. 377,523, filed June 24, 1964, and entitled Substances for Inhibiting Uncontrolled Cellular Growth (now abandoned).

BACKGROUND OF THE INVENTION

(1) Field of the invention

The invention relates to the provision of extract material capable of inhibiting cellular growth in mice of sarcoma 180 and Krebs-2 carcinoma tumors and to the production of such a material which, in dilutions used, is non-toxic for normal human cells, as against human HeLa cells in vitro. The invention additionally relates to the provision of material having the named characteristic and capable of being injected into living organisms or administered orally for the therapeutic treatment of the above named tumors whereby they are caused to regress, and for prophylactic purposes.

(2) Description of the prior art

"Marine invertebrates" as used in this application refers to marine animals having shells and is inclusive of mollusks, snails and similar forms of life; and the researches upon which this application is based have demonstrated that substances can be derived, for example, from oysters, clams, snails, squid (Loligo sp.), whelk (Canaliculatum) and the like, although the origin of the substances has an effect on the degree of activity of the derived substances and the toxicity thereof. Best results have been achieved in the production of extracts from the general class of mollusks, inclusive of oysters and clams; and especially effective extracts have been obtained from clams of the common quahog variety, known as genus Mercenaria and including *Mercenaria mercenaria* (formely designated as *Venus mercenaria*) and *Mercenaria campechiensis*. On the understanding that the scope of the invention is by no means confined thereto, the invention will be described hereinafter in connection with extracts of Mercenaria. These extracts have been found to be non-toxic in the concentrations later set forth and particularly effective in the treatment of Sarcoma 180 and Krebs-2 carcinoma tumors in mice and the treatment of human HeLa cells in vitro.

SUMMARY OF THE INVENTION

The extracts of the present invention are derived from marine invertebrates such as oysters, clams, snails, squid and whelk, and have been found effective both in inhibiting uncontrolled cellular growth of Sarcoma 180 and Krebs-2 carcinoma cancer types in mice and as a prophylactic thereagainst in vivo. They have also been found to be effective against human HeLa cells in vitro.

The bodies of the animals (or individual organs thereof) are macerated and diluted with an aqueous solvent such as distilled water. The macerated and diluted substance is treated with a saturated solution of ammonium sulfate or other suitable material such as methanol, for the purpose of precipitating proteins and other impurities. The precipitate is separated from the supernatant liquid by centrifuging or the like and the supernatant liquid is subjected to dialysis to remove a great part of the toxicity resident in it. The liquid is then dehydrated to form a dry powder, or it may be stored in a frozen condition.

The extract material may be thawed, or if in powder form may be reconstituted and centrifuged. A suitable non-toxic buffer may be added to adjust the pH to about 6.1 to about 7.4. The extract material may then be further purified by the utilization of molecular-sieve techniques. At this point the extract material may again be dehydrated to a dry powder or frozen and stored.

The extract material may be further purified by additional utilization of molecular-sieve techniques and may be subjected to a desalting procedure. A desalting procedure may, in fact, be practiced at any suitable point in the purification process. Desalting may be followed by an additional dialysis step if desired.

DESCRIPTION OF THE PREFERRED EMBODIMENTS

Figure 1:
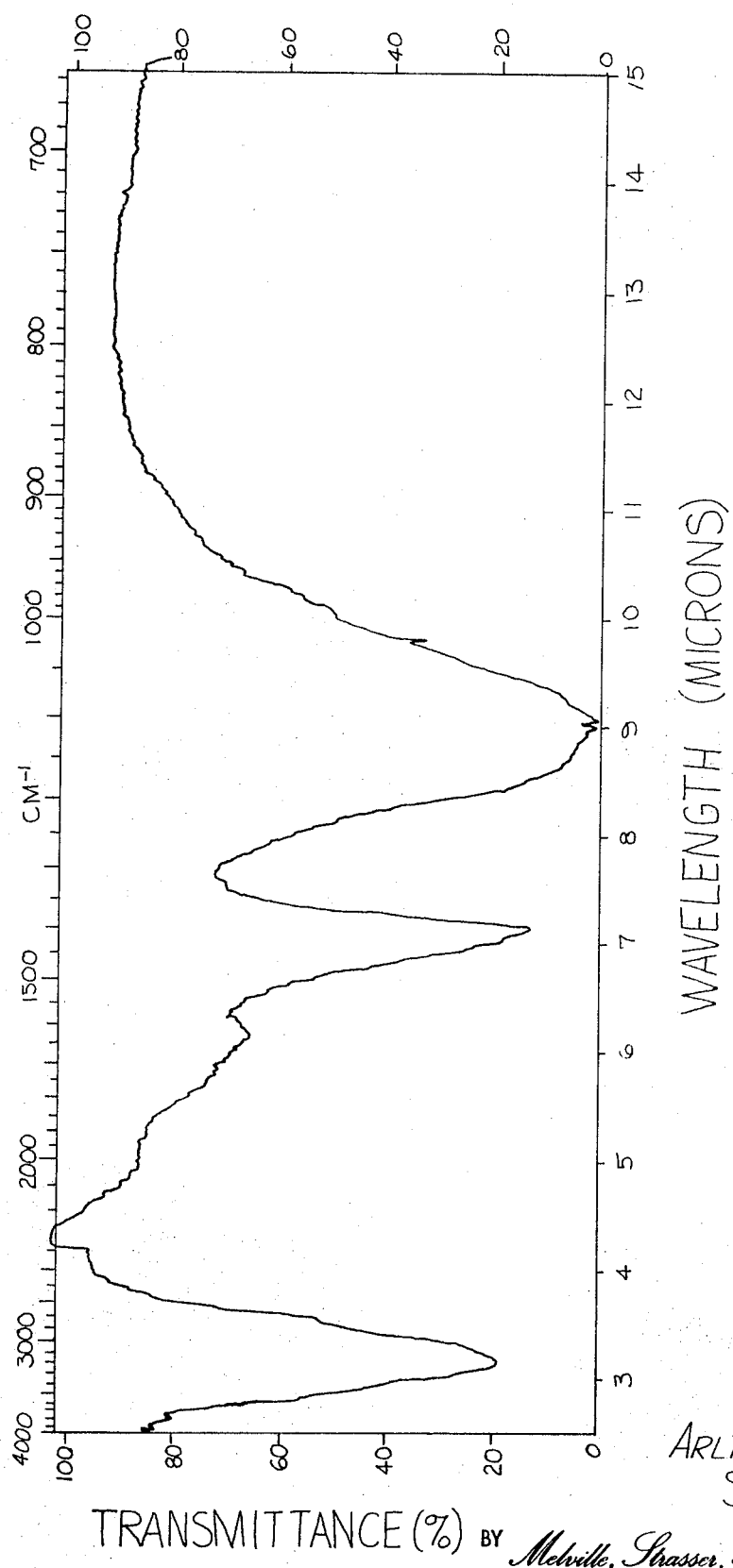
FIG. 1 is an infrared absorption spectrum of the extract material from the whole clam *Mercenaria mercenaria* as isolated by the process of this invention.

The following description may be considered an example of the formation of effective extracts derived from Mercenaria.

Fresh Mercenaria are removed from their valves or shells, usually (but not necessarily) together with that liquid material which is found within the valve but outside the body of the animal. The wet weight of the substance is determined in grams, and varying amounts of distilled water or tap water are added to bring the total volume of the crude material to a reading which gives approximately four "mouse units of activity" per milliliter. A "mouse unit" is that amount of extract necessary to regress tumor growth by 50% when compared to control mice. This is equivalent to 400 to 500 milligrams wet weight of the crude extract of the removed clam substance. The unit of dry weight activity of lyophilized, dialyzed crude extract, before further purification by molecular-sieve techniques, is equal to 20–25 mg. of crude material.

This weight depends on the activity of the clam starting material and the water temperature when the clams are dredged. It will be understood that organs of the clams (such as the crystal body and liver) can be disected from the animal and treated individually or in groups in a manner similar to that used for the whole clam body.

The clam substance is thoroughly macerated as by the use of a dispersing mixer, such as devices sold in the food industry under the trade names "Waring Blendor or "Osterizer."

This treatment may be followed, if desired, by a treatment in a tissue homogenizer, such for example, as that sold by Tri-R Products Corp. The distilled water may be added either before or after the maceration of the clam substance, or omitted entirely.

Next the macerated and diluted substance is treated preferably with a saturated solution of ammonium sulfate found by dissolving 750 grams of ammonium sulfate in a liter of distilled water. This saturated solution is added to the macerated and diluted clam substance in such an amount as will provide a material of 5% to 40% saturation with the ammonium sulfate.

The effect of the addition of the ammonium sulfate is to cause a precipitate to form. The precipitate settles, leaving a supernatant liquid free of precipitate after centrifugation.

The concentration of the initial mixture in terms of ammonium sulfate is important. It has been found that if this concentration lies substantially between 20% and 25% in the initial mixture, the precipitate itself will contain only about 5% to 10% of the substance or substances having the activity, with the remaining 90% to 95% of such substances resident in the supernatant liquid. This makes it possible to discard the precipitate and treat the supernatant liquid in the manner hereinafter set forth. On the other hand, if the initial mixture is saturated to a value higher than 25% but under 50% (but preferably 35% to 49%), the precipitate will contain approximately 66% of the desired active substances while the supernatant liquid contains only about 34% thereof. A reversal of this activity occurs at concentrations above 50% and up to 100% saturation, in that tests in this range have shown that about 66% of the desired active substances will be found in the supernatant liquid. However, about 33% will be found in the precipitate; and this condition while it permits the formation of satisfactory extracts, results in a loss of a greater proportion of the active substances without producing any known advantage. Complete precipitation usually occurs at once or within a very short time, such as one hour at room temperature. It may take up to thirty-six hours at temperatures below room temperature.

The mixture is then treated for the separation of the precipitate from the supernatant liquid. This may be accomplished by allowing the mixture to stand at room temperature or below. Preferably this precipitation is accomplished by centrifuging the mixture at approximately 2000 to 9000 r.p.m. The supernatant liquid, containing by far the greater part of the substances having the activity, is removed and saved, the precipitate being discarded.

As a next step, the supernatant liquid is subjected to dialysis for a period of a few hours to a few weeks against distilled water at a temperature around —20° C. to 50° C. This can be done through the use of a membrane of regenerated cellulose tubing made by the viscose process with an average pore diameter of 1 A. to 75 A. as determined by the rate of flow of water through the film. This is done in a suitable vessel in which the supernatant liquid is located on one side of the membrane and distilled or tap water on the other. A more convenient operation can be carried on by placing the supernatant liquid in a closed tube or bag of the cellulose membrane substance and suspending it in water for the desired length of time.

The dialysis serves to remove from the supernatant liquid a great part of the toxicity resident in it. Without wishing to be bound by theory, it is nevertheless, believed that toxic substances so removed consist essentially of potassium and other metal salts. The distilled water, changed several times during dialysis and now containing toxic substances, is discarded; and the supernatant liquid is treated as next described. It will be understood that the use of running water could hasten dialysis by many hours. If the dialysis step is allowed to proceed for an undue length of time, the active agent can be caused to pass into the water in which the bag is suspended. Should there have been a lengthy dialysis, the dialysate can also be treated as next described. Whether or not a significant amount of the active material has passed into the dialysate can be determined in a number of ways including known chemical analysis procedures.

The liquid is dehydrated to the point of producing a dry powder from the solute therein. This may be done in various ways as by freeze-drying. Preferably the liquid is subjected to lyophilization at low temperature (below freezing and preferably at —20° C. or below) under a very high vacuum such as below 200 microns of mercury until a dry powder is produced. It has been found that the dry powder keeps well if stored at temperatures in the neighborhood of —180° C. to +5° C. The powder if well stoppered can be stored for short intervals at room temperature. Alternatively, the liquid may be frozen and stored.

Further purification of the active substances is practiced upon the extract after thawing (if it had been frozen and stored), or upon a reconstituted extract formed by dissolving the dry powder in sterile or non-sterile distilled water on suitable buffer to form a solution of approximately the concentration of desired activity in the supernatant liquid. The reconstituted extract will have some material not in solution, unless a sufficient quantity of solvent is used. Centrifugation at room temperature at 1500–3500 r.p.m. will leave a light tan supernate. This supernate is then used as described hereinafter. An appropriate buffer may be phosphate, sodium chloride or other non-toxic substance, the buffer being used in such quantity as to give a pH of about 6.1 to about 7.4; and the reconstituted extract is introduced into filtration columns (utilizing molecular-sieve techniques) containing cross linked dextran chains. Suitable gels are sold under the trademark Sephadex; and it has been found that medium and fine grades of Sephadex gel available under the trade designations G–100, G–75, G–50, G–25 and G–10 are all useful in accomplishing purification. However, grade G–25 has been found to give a filtrate having the highest percentage of the activity.

Fractions from various filtration columns are presently collected on a common fraction collector. The materials so collected are suitable for use and for testing in vivo or in vitro. Further purification of the active material from Mercenaria is achieved on the Sephadex gel columns mentioned above, so that this inhibitor can be localized in cuts or Void volumes ($V_o$) of samples from the fraction collector. A typical example of this is as follows:

If approximately 0.70 gram of crude ammonium sulfate treated, dialyzed material is reconstituted in 8–10 ml., 0.1 M NaCl, centrifuged at approximately 3000–5000 r.p.m. for 10–15 minutes, and the supernatant applied to the gel column of Sephadex G–25, the greatest percentage of active material will appear in $V_o$ #2 and #3, where the $V_o$ is defined as that amount of elute of buffer necessary to cause a sample of human hemoglobin to be washed from the column. In a glass column 200 mm. in diameter x 800 mm., in length, the $V_o$ is approximately 80–100 ml. depending on the packing of the Sephadex in the column. Most of the active material, then, can be collected from the fractions composing tubes 9–16, when the 10 ml. volumetric siphon is used on the fraction collector. Over 60% of the inhibitor agent can be collected from the $V_o$ #2. Dry weight samples of $V_o$ #2 yield crystalline material that contains the inhibitor with activity. Tubes 9–16, a total volume of 80 ml. were lyophilized as described earlier, and tubes 17-20 also were lyophilized to obtain a powder. This material was then reconstituted to 20 ml. with 0.1 M NaCl and injected into the Swiss mice in a volume of 0.25 ml./animal/day/7 days.

If the above mentioned tubes 9-16 were not mixed together but each tube of 10 ml. was injected into a separate set of test animals, with a proper control group, it was found that 65% of the growth inhibitor occurred in tube 14. This was verified by comparing the mean tumor weight of those animals treated in each group with the mean control weight. A typical result gave a weight of 2150 mg. in the control animals while those in that group tested with the sample from tube 14 mentioned above gave a weight of 754 mg. The animals received approximately 8 mg. dry weight of the still partially purified material/animal/day/7 days to produce this effect.

Ammonium sulfate is the preferred material for precipitating impurities in making the extract of this invention; but others may be used. For example, when the initial mixture is treated with four volumes of methanol, with the extraction occurring between about $-20°$ C. and $+2°$ C., a supernatant liquid is formed containing about 70% of the total activity of the mixture. However, if the extraction is carried out at room temperature, the supernatant liquid will contain only about 18% to 20% of the total quantity of the substances in the mixture. Acetone may be used in place of methanol with approximately similar results.

It has been noted that elevated temperatures destroy the activity of the crude extract before purification on Sephadex. For example, if the extract is boiled for fifteen minutes, its activity appears to be wholly destroyed. A heating to 60° C. for the same or a longer time will destroy at least 60% of the activity of the extract. However, heating the extract to about 37° C. does not appear to affect its activity. It has also been noted that a pH below about 6.0 and above about 7.5 to 8.0 impairs the activity of the crude extract before purification on Sephadex. In contrast, aqueous solutions of the extract, after purification on Sephadex, have retained their biological activity after having been heated for 45 minutes at 100° C.

The precise nature of the active substance or substances in the extracts of this invention is not known. It is evident that the active substances under normal dialysis conditions and time are substantially non-dialyzable in the crude extract, and lyophilization at $-20°$ C. or below does not destroy their activity. Comparisons of the activities of various fractions of the extract obtained from gel filtration columns would suggest that the so-called active complex substance or substances have a molecular weight of about 280-5000. In the Beckman D U spectrophotometer activity was in the 260-280 millimicron absorbing area, although this may not mean the active agent is nucleic acid or protein. It may indicate the active substance is in some way masked by materials in the 260-280 millimicron range present in a particular Void volume ($V_o$) from the gel filtration column in high percentage. The use of nigrosine combined with electrophoresis on cellulose acetate does not indicate that lipids constitute the source of anti-tumor activity in the partially purified extracts.

Samples of the extract from ten independent preparations had elemental compositions in the ranges: C, 5.9-6.9; H, 4.8-5.8; N, 10.1-13.2; P, 0.1-0.15; S, 15.7-16.7; ash (as sulfate), 41.7-42.6%. X-ray powder diffraction patterns of the solid samples revealed lines of moderate intensity corresponding to ammonium sulfate and sodium chloride, together with a complex pattern of sharp lines indicative of a crystalline, organic substance.

Infrared spectra (Kbr disc) showed broad peaks at 3.1 and $4.2\mu$, a peak of relatively low intensity at $6.1\mu$, and peaks at 7.0, 8.9 and $16\mu$. Aqueous solutions gave the following ultraviolet absorption maxima, with percent absorptivities given in parentheses: 194 (1.925), 270 (0.525), and $330 m\mu$ (0.35). No optical activity could be detected at the sodium D line with a 2% solution in a 1 dm. tube. Ultracentrifugation studies on 1% aqueous solutions of the material, with a Spinco Model E ultracentrifuge and schlieren optics, revealed no detectable high-molecular weight component (M>5000). Calculation of molecular weight from measurements with the synthetic boundary technique gave values in the range 280-550. These values must be interpreted with caution since the preparations contain salts and accurate measurements in this range are difficult.

The nuclear magnetic resonance (N.M.R.) spectra of the samples, determined with a Varian A-60 spectrometer on solutions in deuterium oxide, with tetramethylsilane as external standard, showed broad, unresolved signals in the regions $\tau 2.0$-3.0 and 3.2-3.7, a sharp signal at $\tau 4.2$, a broader signal at $\tau 4.5$, signals in the region $\tau 4.7$-5.5 with the HOD signal at $\tau 5.10$, and a series of signals at $\tau 5.8$-6.0, 6.15, 6.25-6.40, and 6.53. No signals were observed in the region $\tau 6.8$-10.0.

Analysis of the preparations by paper and thin-layer chromatography revealed the presence of at least 10 substances behaving as free amino acids, together with free reducing sugars, and material which remained at the origin of the chromatogram. The presence of inorganic salts made detailed identification of the components difficult.

In the Dische reaction the samples gave a color having maximal absorption at 404-406 $m\mu$. This maxima differs slightly from that given by hexoses. The material gave negative results in quantitative Elson-Morgan and Morgan-Elson determinations, indicating that amino sugars, acetamido sugars, and sialic acids are absent.

The foregoing data indicate that the extract preparations are heterogeneous, contain salts, low-molecular weight organic components, and material of intermediate molecular weight; the procedures used failed to detect any high-molecular weight (M>5000) component. The negligible phosphorus content indicates that little nucleotide-type material is present, and the N.M.R. data reveal the absence of detectable portions of lipid-type component, C-methyl groups, or other substances having highly shielded protons. Methylene- and methine-type protons appear to be present, together with strongly deshielded protons giving signals at low field. The infrared and ultraviolet spectral data accord with the presence of hydroxyl and amide groups. Biologically active material passes slowly through Visking dialysis membrane [6], but is retained more strongly by a cellophane membrane, suggesting that at least part of the active principle is a substance of intermediate molecular weight (M 1000-2000), which may have a glycopeptide type of structure.

The partially purified extract formed as set forth above and containing the buffer (preferably 0.1 MaCl) may be relyophilized and stored as a dry powder (or frozen and stored). When in the dry powder form, the extract may be administered orally. If desired, it may also again be reconstituted and subjected to further treatment in gel filtration columns, making sure that it is buffered to neutrality. Alternatively, the reconstituted and purified extracts may be stored and used as such by way of subcutaneous injection, or they may be subjected to even further purification procedures.

For example, the partially purified extract, having been subjected to gel filtration and lyophilized or frozen, may be reconstituted or thawed and desalted by the use of well known desalting appaartus. Prior to desalting, the reconstituted extract may if desired be centrifuged and buffered as described above. The desalting procedure removes inorganic salts, with minimal loss of low-molecular weight substances having no net change. As a result the extract is further purified and concentrated. Tests have been conducted wherein extract samples were desalted in a Research Specialities Co. electric desalter, Model A-1930, equipped with a Visking membrane. The samples (0.5 g.) in water (10 ml.) were placed on the negative electrode (mercury), and an initial current of <0.8 ampere, at 40–80 volts, was passed. Desalting was completed and the solutions were filtered and lyophilized. Yields of dried product were in the range of 5.0–11.4%.

It was found by assay in cell culture with the HeLa line that the net loss of biological activity on desalting was negligible, yet there was a great loss of various salts and other undesirable elements in the extract samples. The desalted samples were characterized by approximately tenfold concentration of activity.

The desalted samples were obtained as slightly colored syrups having ultraviolet absorption maxima (in water) at 214 (16.7), 234 (16.7), 250 (8.64), and 274 m$\mu$ (6.0). No optical activity was detected with a 1% aqueous solution in a 1 dm. tube. The material contained approximately 4% of sulfur.

The desalted samples were analyzed for free amino acids by two-dimensional paper chromatography, and by thin-layer chromatography on Avicel stationary phase with the two-dimensional technique. Components were present having mobilities indistinguishable from those of the following amino acids: alanine, 4-aminobutyric acid, glycine, isoleucine, leucine, neoleucine, threonine (major); histidine, lysine, serine (minor); arginine, aspartic acid, proline (trace). Substances behaving as free reducing sugars were also present; one had the characteristics of glucose, and another, $R_{glucose}$ 0.70 (6:4:3 butyl alcohol-pyridine-water system), was different from all common aldoses, ketoses, and uronic acids used for comparison. In the Dische reaction the desalted sample gave an absorption maximum of 400 m$\mu$, the value expected for a 6-deoxyhexose, but free fucose and rhamnose were absent. The Elson-Morgan and Morgan-Elson reactions were negative.

Figure 2:
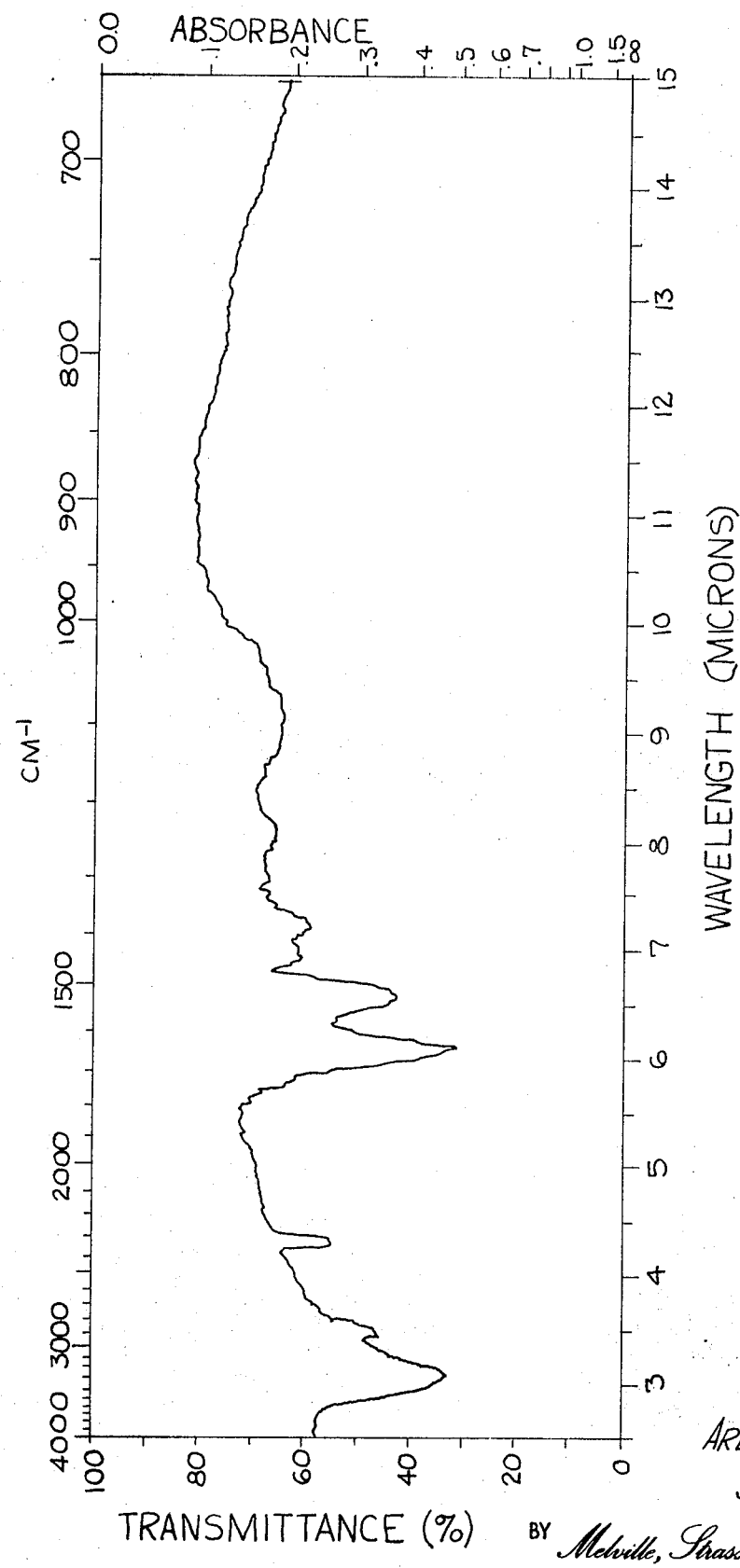
FIG. 2 is an infrared absorption of the extract material from the whole clam *Mercenaria mercenaria* when purified by dialysis after the original gel filtration and desalted.

FIG. 2 illustrates the infrared spectrum for the desalted extract.

The desalting step may be carried on as indicated, or it may be performed at any appropriate place earlier in the purification process. For example, desalting may follow the first dialysis step in the purification procedure, or it may follow the steps of reconstitution, centrifugation and buffering prior to a first treatment in the gel filtration column.

In further tests, desalted samples were freed from components of low molecular weight by dialysis, with a cellophane membrane, against running distilled water for 24 hours at 5°. The resultant solution was free from reducing sugars and free amino acids, and upon lyophilization it yielded a slightly colored, hygroscopic powder. This desalted, exhaustively-dialyzed material which was about 1% of the weight of the original samples, was extremely active in cell culture against human HeLa cancer cells. The solution containing substances which had passed through the membrane was evaporated. The residue was found to be biologically active and, although the relative activity on a unit-weight basis was less than that of the non-dialyzable material, the higher weight recovery for this fraction indicates that a considerable proportion of the active material had passed through the membrane.

Examination of the material which had passed through cellophane membrane revealed the presence of the same free amino acids as were detected in the desalted sample, together with a glucose and a smaller proportion of the reducing substance, $R_{glucose}$ 0.70, previously detected in the desalted sample.

The desalted, exhaustively-dialyzed material showed ultraviolet absorption maxima, in water, at 203 (20.0) and 272–275 m$\mu$ (1.9), and infrared absorption at 2.8 (strong, OH), 5.7 (moderate, ester), 6.0 (moderate, amide), 7.1, 7.4 (moderate), 8.2 (strong), 8.8, 9.3, and 9.7$\mu$ (moderate). Acid hydrolysis in N hydrochloric acid for 2 hours at 100° gave the reducing substance $R_{glucose}$ 0.70, as the major hydrolytic fragment, together with a very much smaller proportion of a reducing substance behaving as a glucose [by paper chromatography, thin-layer chromatography, and by trimethylsilylation followed by gas-liquid chromatography]. Vigorous hydrolysis (6 N hydrochloric acid, 36 hr., 100°) of the desalted, exhaustively-dialyzed material gave products whose chromatographic properties indicated the following amino acids: alanine, 4-aminobutyric acid, glycine, isoleucine, leucine, neoleucine, serine, threonine (major); histidine, lysine (minor); arginine, aspartic acid, proline, taurine, tyrosine (trace).

Acetylation of desalted, exhaustively-dialyzed material either with acetic anhydride-pyridine at 25°, or with hot acetic anhydride-sodium acetate, gave a chloroform-soluble, acetylated product in high yield, which migrated as a single, compact zone, $R_f$ 0.36, by thin-layer chromatography on activated silica gel, with 7:3 benzene-ethyl acetate as developer. The product showed infrared absorption at 3.4 (strong), 5.75 (strong, OAc), 6.1 (weak, amide), 6.8, 7.3 (moderate), 8.0, 9.0, 9.4 (strong), 12.5–14.5$\mu$ (moderate).

The evidence herein presented suggests that the desalted, exhaustively-dialyzed material probably has a glycopeptide-type structure, possibly associated with a small proportion of protein; the latter could give rise to some of the trace amino acids that are observed, since it is by no means certain that all of these amino acids are constituents of the major molecular species in desalted, exhaustively-dialyzed material.

A very large number of tests has demonstrated the effectiveness of the extracts of this invention. Many of these tests have been carried on in CFl Swiss albino inbred mice having implants of Sarcoma 180 formed by the trochar method in the axillary region and allowed to develop in the mice for a period of four full days before starting treatment. Animals showing no evidence of tumor on the fourth full day after implantation were rejected for the tests; and the remainder of the animals were divided into several groups, i.e. a group of controls which were given injections of normal sterile physiological saline solution not containing any of the extract and a group or groups of animals which were given treatment by the subcutaneous injection of the extract of this invention. The injections for both the control and the treated mice had a volume of 0.25 milliliter and were administered subcutaneously daily in the left axillary region. The injections for the treated mice contained one "mouse unit" of crude extract in a volume of 0.25 milliliter.

The results of repeated tests were striking. The control mice invariably died within 10–28 days after the implantation of the tumor. All of the treated mice survived and showed regression and inhibition of the tumor. Regression and inhibition of tumor in most experiments has been effective in 80–100% of Swiss mice treated with extract.

One mode of determining the effectiveness of the treatment involving sacrificing the treated mice on the eighth day after treatment was begun, excising the tumors, weighing them, and comparing the weight of the tumors with the weights of tumors similarly excised from control mice. Excised tumors of the treated and control groups showed, in many cases, 200–300% smaller tumor weight in treated animals than in control groups. In all of the treated mice in many of the tests, and in at least 80% of the treated mice in all tests, at least 50% regression of the tumors was found with 100% inhibition of tumor growth.

Certain of the treated mice were not sacrificed but, instead, were allowed to live beyond the normal sacrifice time in order to determine the long-range effects of the extract. These mice evidenced no recurrence of the tumor. They produced normal litters.

Similar tests with female Swiss mice were made respecting the Krebs-2 carcinoma type tumor. Fifteen control animals and groups of ten treated mice were each injected with 0.25 milliliter of ascites fluid in the right axillary region. The tumor was allowed to grow four full days before starting treatment with the extract of this invention. The results were essentially the same as those outlined above for tumors of the Sarcoma 180 type. This experiment was repeated six times and involved one hundred and fifty animals. The most effective fraction from the Sephadex gel columns was, again, the fraction obtained by filtering through G-25 silica gel. After seven days of treatment, the mean tumor weight in treated mice was 754 mg., whereas the mean tumor weight in control mice was 2150 mg.

Microscopic examination of tumor tissue from animals such as mice, after treatment by subcutaneous injection of the extract, exhibits the following characteristics:

(1) Excellent and widespread oncolysis (death) of cancer cells.

(2) No toxicity to normal, non-cancerous cells.

(3) Infiltration of original tumor site by fibroblasts, colleagen, histiocytes and macrophages.

The above description is typical of that found in a healing tissue after wounding. It is termed an "inflammatory response" in pathology.

Microscopic-histological examination of those mice which were treated with the extract, allowed to live six months and then sacrificed, show a complete absence of tumor cells and young scar tissue at the original tumor site. These animals produced normal litters of mice.

The extractions in the dilutions set forth proved to be non-toxic to the mice.

In vitro investigations of the effects of the extract of the present invention incorporated the standard procedures for tissue culture of HeLa and human amnion cell lines. The cells were grown in monolayer, using Eagle's MEM, 5% calf serum and Hank's BSS on sterile glass in milk dilution bottles for six days. The cells were then trypsinized and centrifuged. The pellet was re-suspended in culture media, and 1 ml. aliquots of approximately 1000 cells were transferred to each sterile Leighton tube. Each tube was then incubated twenty-four hours at 37° C. At the end of twenty-four hours from about 0.10 to about 0.25 ml. of crude extract, per ml. of culture media, was added to each tube. Controls were kept for the HeLa and amnion lines tested. Readings, according to Syverton's Standard Scale of Cell Degeneration were made of each culture tube at twenty-four, forty-eight and seventy-two hours.

The samples of the extract were found to be active against the human HeLa cells (these cells undergoing complete degeneration within seventy-two hours), whereas the samples showed negligible toxicity on normal human amnion cells.

Further experiments have been performed illustrating the effectiveness of the extracts of the present invention when the starting material comprises the livers of clams *Mercenaria mercenaria*.

HeLa cells (Atl) and human amnion cells (FL) were grownout in monolayer on sterile glass in milk dilution bottles. The medium consisted of Hank's balanced salt solution (BSS) with Eagle's basel medium and 20% calf serum. After 7 days growth at 37° C., the cells were harvested, centrifuged at 1000 r.p.m. and resuspended in fresh medium. A hemacylometer count indicated approximately $1 \times 10^4$ cells per ml. of medium. One ml. cell aliquots were then dispersed into sterile Leighton tubes and incubated at 37° C. for 24 hours before dividing the tubes into the experimental control groups. After 24 hours incubation, clam liver samples (0.50 mg./.25 ml. of medium) were added to each experimental culture. Control cultures received an identical volume of medium only. All tubes were again incubated at 37° C. Each tube of the experimental and control group was read at 24 hours and 48 hours after the addition of exogenous amino acids or the placebo. The results were interpreted according to the Standard Syverton Scale. The results are summarized in Table I below.

TABLE I

| Description of extract | Readings at— | |
|---|---|---|
| | 24 hr. | 48 hr. |
| HeLa cell toxicity: | | |
| 1. Crude, whole clam [1] | 2+ | 3+ |
| 2. Clam liver only [1] | 3+ | 4+ |
| 3. Dialyzed whole clam [1] | 2+ | 3+ |
| 4. Clam liver extract [1] | 2-3+ | 3-4+ |
| 5. Clam liver dialyzed [1] | 3+ | 4+ |
| Human amnion cell toxicity for each of the above | 0 | 0 |

[1] Fractionated on Sephadex G-25.

In vivo experiments with clam liver extracts were performed with respect to the Krebs-2 solid carcinoma and Sarcoma 180. The extracts were prepared as described above, including fractionation and desalting.

The transplanation procedures are those used in the SCNSC (Screening Center of the National Cancer Institute). Each animal received 250 mg./kg. body weight mercenene over a seven day period. The results in both experimental tumors were as follows:

$T/C = 29\%$ (71% greater retardation of the tumor in treated animals when compared to controls)

The above experiments show that extracts from clam liver show regression and inhibition at least equal to that achieved with the whole clam body when using an identical dosage schedule.

Studies are continuing to determine whether the extracts can be further purified, and to determine, if possible, the chemical composition with a view toward synthesis.

Modifications may be made in the invention without departing from the spirit of it. For example, it will be understood by one skilled in the art that where time and circumstances permit, the steps of dehydrating or freezing and reconstituting or thawing need not be performed between various steps in the purification and concentration process. Thus, after the first dialysis step, the extract material may be directly subjected to further purification by molecular - sieve techniques. Similarly, after passing through the gel filtration column, the extract material could be desalted without intermediate treatment.

When the extract material is thawed (after having been stored in frozen condition) for use in tests or treatment or for the purpose of being subjected to further purification and concentration techniques, it is generally not necessary to centrifuge or buffer it. Centrifugation and buffering are often (but not always) desirable when the extract is reconstituted from a dry powder form. This will depend largely on the condition and degree of purification of the extract material prior to its dehydration to the dry powder form.

The embodiments of the invention in which an exclusive property or privilege are claimed are defined as follows:

1. An extract from the bodies or individual crystal bodies or livers of clams of the genus Merceneria having the following properties:

(a) effective in inhibiting the growth of sarcoma 180 and Krebs-2 carcinoma tumors in mice;

(b) effective in inhibiting the growth of human HeLa cells in vitro;

(c) having ultraviolet absorption maxima (in water) at 214, 234, 250 and 274;

(d) having a characteristic infrared absorption spectra as shown in FIG. 2 of the accompanying drawings;

(e) having an elemental composition in the ranges: C, 5.9–6.9; H, 4.8–5.8; N, 10.1–13.2; P, 0.1–0.15; S, 15.7–16.7; ash (as sulfate), 41.7–42.6%;

(f) having a pH of from 6.1 to 7.4;

(g) and containing an active agent having a molecular weight of less than 5000.

2. A process of producing the extract of claim 1 comprising the steps of macerating the bodies, individual crystal bodies or livers of said clams of the genus Merceneria and the liquid material found within the valve but outside the clam body to form a liquid mixture thereo, precipitating from said liquid mixture impurities precipitatable by ammonium sulfate, separating said precipitate from the associated liquid by centrifuging at from about 2000 to about 9000 r.p.m. to form a supernatant liquid free of said precipitate and dialyzing said supernatant liquid against water at a temperature of from about −20° C. to about 50° C., utilizing a membrane capable of retaining a substance having a molecular weight of about 280 and above, at least once introducing said dialyzed liquid into a filtration column containing a gel of such character that the eluate will contain substances having a molecular weight of 5000 and less, collecting the eluate material from said column, electrically desalting said eluate material whereby inorganic salts are removed therefrom, dialyzing said desalted material against water at a temperature of about 5° C., utilizing a cellophane membrane, and adjusting the pH of said dialyzed material to from 6.1 to 7.4.

References Cited
FOREIGN PATENTS 447,268   5/1936   Great Britain _____ 424—95

JEROME D. GOLDBERG, Primary Examiner

U.S. .Cl. X.R.

424—95